United States Patent [19]

Holmberg

[11] Patent Number: 5,019,002

[45] Date of Patent: May 28, 1991

[54] METHOD OF MANUFACTURING FLAT PANEL BACKPLANES INCLUDING ELECTROSTATIC DISCHARGE PREVENTION AND DISPLAYS MADE THEREBY

[75] Inventor: Scott H. Holmberg, San Ramon, Calif.

[73] Assignee: Honeywell, Inc., Minneapolis, Minn.

[21] Appl. No.: 218,312

[22] Filed: Jul. 12, 1988

[51] Int. Cl.$^5$ .............................................. H01L 45/00
[52] U.S. Cl. ................................ 445/24; 357/23.13; 437/56
[58] Field of Search ................... 445/24, 3; 357/23.13, 357/4; 437/4, 8, 56

[56] References Cited

U.S. PATENT DOCUMENTS

| | | | |
|---|---|---|---|
| 4,455,739 | 6/1984 | Hynecek | 427/8 X |
| 4,586,242 | 5/1986 | Harrison | 437/8 |
| 4,714,949 | 12/1987 | Simmons et al. | 357/23.13 |
| 4,736,271 | 4/1988 | Mack et al. | 357/23.13 |
| 4,803,536 | 2/1989 | Tuan | 357/23.13 |

Primary Examiner—Kenneth J. Ramsey
Attorney, Agent, or Firm—Leydig, Voit & Mayer

[57] ABSTRACT

Flat panel displays are provided including protection from electrostatic discharge (ESD) during manufacture and thereafter. At least one ESD guard ring is provided to protect the active elements of the display from the potential discharge between the row and column lines. An internal ESD guard ring is coupled to the row and column lines via shunt transistors. An external ESD guard ring is coupled to the row and column lines via a resistance. Both of the guard rings can be provided; however, the external guard ring is removed prior to completion of the display.

36 Claims, 5 Drawing Sheets

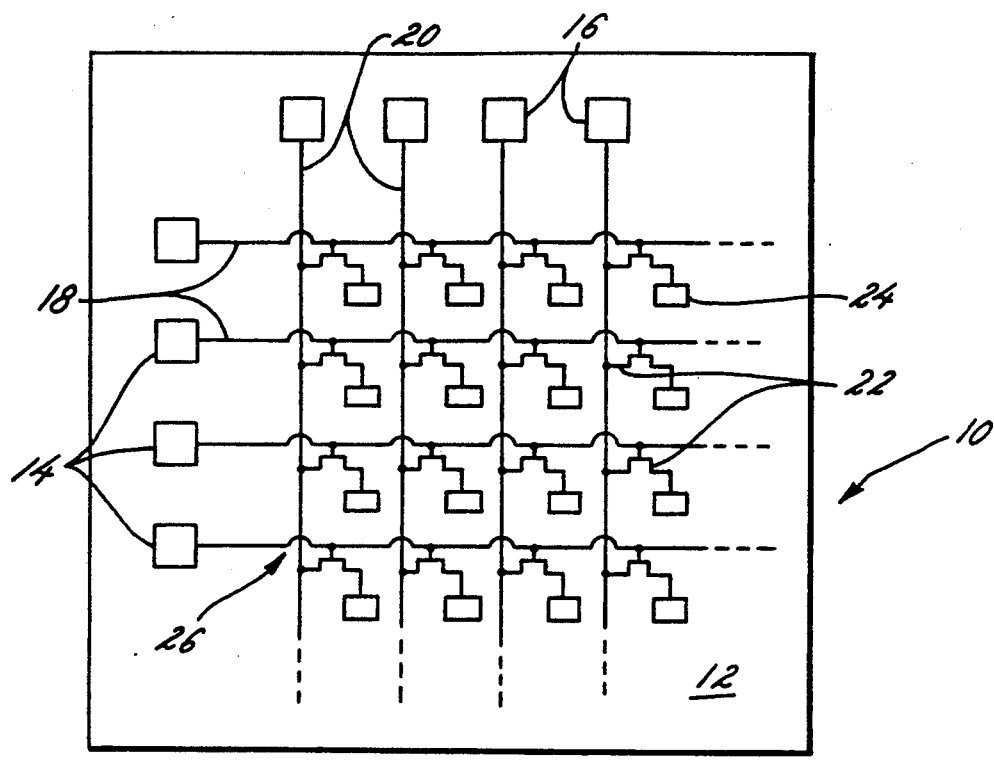
FIG. 1
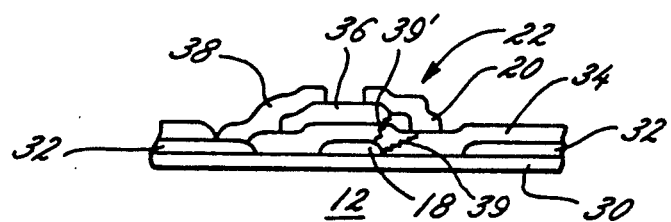
FIG. 2
FIG. 3
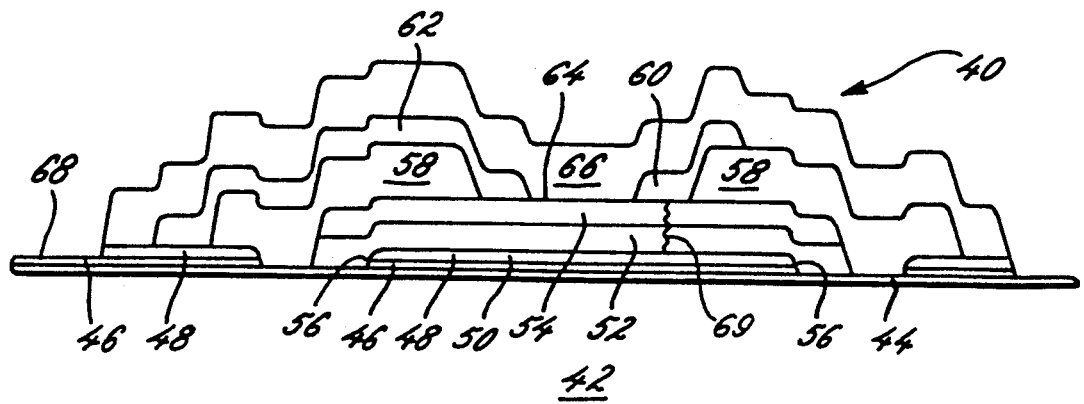

METHOD OF MANUFACTURING FLAT PANEL BACKPLANES INCLUDING ELECTROSTATIC DISCHARGE PREVENTION AND DISPLAYS MADE THEREBY

BACKGROUND OF THE INVENTION

The present invention pertains to improved flat panel displays and methods of making the displays with protection from electrostatic discharges. More particularly, the present invention is directed to methods of increasing the manufacturing yields of flat panel display backplanes and the displays made therefrom by improving handling characteristics.

In recent years there has been growing interest in flat panel displays, such as those which employ liquid crystals, electrochromic or electroluminescence, as replacements for conventional cathode ray tubes (CRT). The flat panel displays promise lighter weight, less bulk and substantially lower power consumption than CRT's. Also, as a consequence of their mode of operation, CRT's nearly always suffer from some distortion. The CRT functions by projecting an electron beam onto a phosphor-coated screen. The beam will cause the spot on which it is focused to glow with an intensity proportional to the intensity of the beam. The display is created by the constantly moving beam causing different spots on the screen to glow with different intensities. Because the electron beam travels a further distance from its stationary source to the edge of the screen than it does to the middle, the beam strikes various points on the screen at different angles with resulting variation in spot size and shape (i.e. distortion).

Flat panel displays are manufactured to be substantially free of such distortion. In the manufacture of flat panel displays the circuit elements are deposited and patterned, generally by photolithography, on a substrate, such as glass. The elements are deposited and etched in stages to build a device having a matrix of perpendicular rows and columns of circuit control lines with a pixel contact and control element between the control line rows and columns. The pixel contact has a medium thereon which is a substance that either glows (active) or changes its response to ambient light (passive) when a threshold voltage is applied across the medium control element. The medium can be a liquid crystal, electroluminescent or electrochromic materials such as zinc sulfide, a gas plasma of, for example, neon and argon, a dichroic dye, or such other appropriate material or device as will luminesce or otherwise change optical properties in response to the application of voltage thereto. Light is generated or other optical changes occur in the medium in response to the proper voltage applied thereto. Each optically active medium is generally referred to as a picture element or "pixel".

The circuitry for a flat panel display is generally designed such that the flat panel timeshares, or multiplexes, digital circuits to feed signals to one row and column control line of the pixels at a time. Generally one driving circuit is used for each row or column control line. In this way a subthreshold voltage can be fed to an entire row containing hundreds of thousands of pixels, keeping them all dark or inactive. Then a small additional voltage can be supplied selectively to particular columns to cause selected pixels to light up or change optical properties. The pixels can be made to glow brighter by applying a larger voltage or current of a longer pulse of voltage or current. Utilizing liquid crystal displays (LCD's) with twisted nematic active material, the display is substantially transparent when not activated and becomes light absorbing when activated. Thus, the image is created on the display by sequentially activating the pixels, row by row, across the display. The geometric distortion described above with respect to CRT's is not a factor in flat panel displays since each pixel sees essentially the same voltage or current.

One of the major problems that arises with respect to the prior art method of manufacture of backplanes for active matrix displays (e.g. those employing thin film transistors at each pixel) is that they generally suffer production yield problems similar to those of integrated circuits. That is, the yields of backplanes produced are generally not 100% and the yield (percentage of backplanes with no defects) can be 0% in a worst case. High quality displays will not tolerate any defective pixel transistors or other components. Also, larger size displays are generally more desirable than smaller size displays. Thus, a manufacturer is faced with the dilemma of preferring to manufacture larger displays, but having to discard the entire product if even one pixel is defective. In other words, the manufacturer suffers a radically increased manufacturing cost per unit resulting from decreasing usable product yield.

One solution to the low yield problem is disclosed in U.S. Ser. No. 948,224, filed Dec. 31, 1986, now U.S. Pat. No. 4,676,761 entitled "Method of Manufacturing Flat Panel Backplanes Including Improved Testing and Yields Thereof and Displays Made Thereby", which is owned by the assignee of the present application and is incorporated herein by reference.

These problems of increased cost and decreased yield are improved in the present invention by providing methods of manufacturing display backplanes and the resulting displays with electrostatic discharge protection which provide protection against fatal defects during and after manufacture of the displays.

SUMMARY OF THE INVENTION

There is provided improved methods of manufacturing backplanes and the resulting flat panel displays to increase the manufacturing yield, decrease manufacturing costs and substantially eliminate fatal display defects caused by electrostatic discharge during manufacture and thereafter.

These improvements are accomplished by forming at least one electrostatic discharge (ESD) guard ring around the active elements of the display. An internal ESD guard ring can be formed, which provides a discharge path for static potential applied across the row and column line of the display. This prevents the potential from discharging between the row and column lines through an active element causing a short and resulting in a defect in the display during manufacture or thereafter. An external ESD guard ring can be formed, which provides protection during manufacture of the displays, however, the external ESD guard ring is removed at the end of the display manufacturing process. The displays also can include both the internal and external ESD guard ring to provide protection during manufacture and thereafter.

BRIEF DESCRIPTION OF THE DRAWINGS

FIG. 1 is a plan view schematic representation of an active matrix display backplane made by a prior art method;

FIG. 2 is a cross-section of one transistor of the prior art backplane which could be utilized with the present invention;

FIG. 3 is a cross-section of one transistor which could be utilized with the present invention;

DESCRIPTION OF THE PREFERRED EMBODIMENTS

Figure 4:
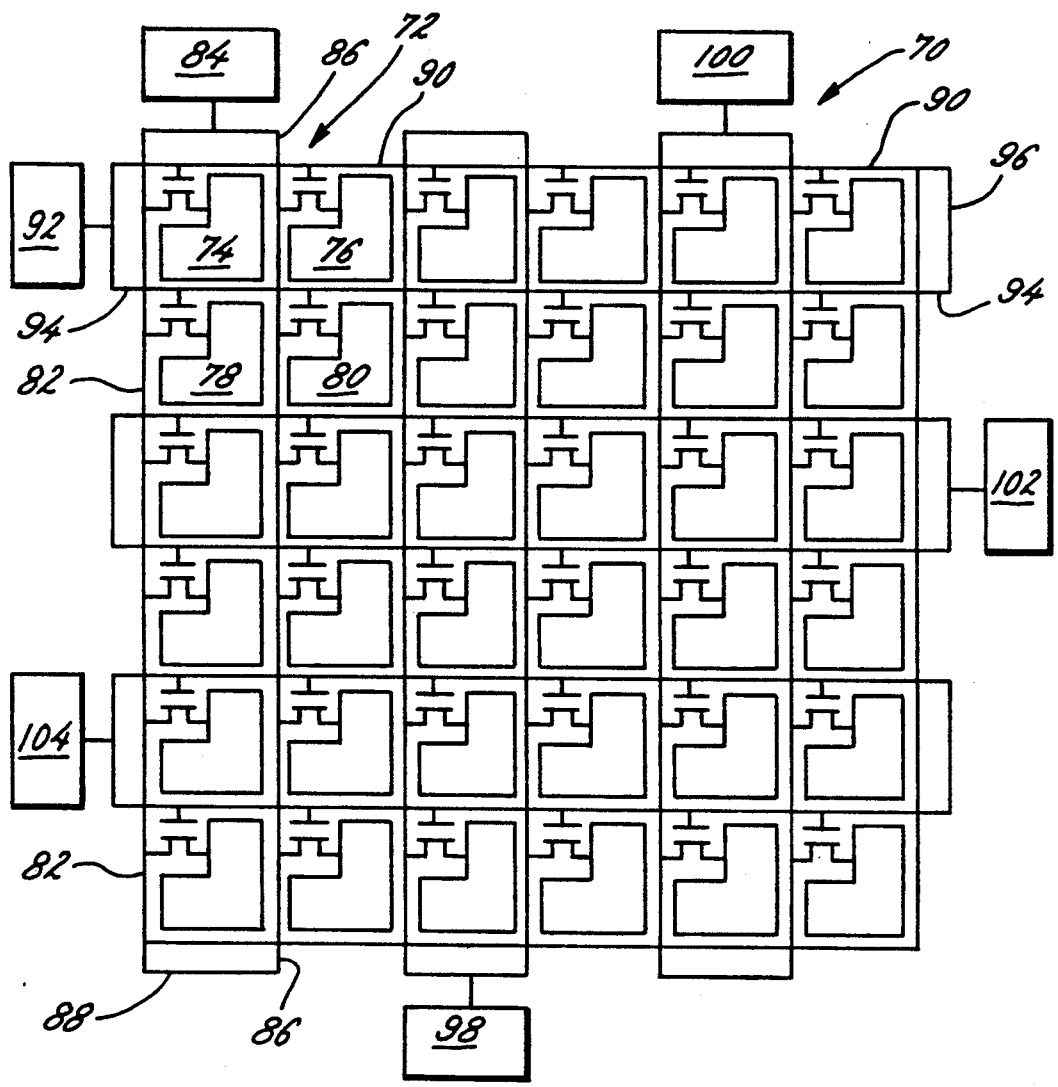
FIG. 4 is a plan view schematic representation of one prior embodiment of a subpixel matrix display.

Referring now more particularly to FIG. 1, there is shown a schematic representation of an active matrix flat panel display device 10 made in accordance with conventional photolithographic techniques. One such device 10 and the manufacture thereof is more fully described in Application of Amorphous Silicon Field Effect Transistors in Addressable Liquid Crystal Display Panels, A. J. Snell, et al., *Applied Physics*, No. 24, p. 357, 1981. The device 10 includes a substrate 12, sets of contact pads 14 and 16, sets of control or bus lines 18 and 20, and, in this particular example of the prior art, transistors 22 and pixel back contacts 24.

The substrate 12 commonly employed in these devices is formed from glass. The control lines 18 and 20 are organized into a matrix of rows 18 and columns 20. The control line rows 18 in this device 10 serve as gate electrodes and the control line columns 20 as source connections. One contact pad 14 is connected to one end of each of the row control lines 18. One contact pad 16 is connected to one end of each of the column control lines 20. The display drive control (not shown) is connected to the sets of pads 14 and 16.

At each matrix crossover point 26, where a row line 18 and a column line 20 cross, a switching element, transistor 22 is formed to connect the row line 18 and column line 20 to the pixel back contacts 24. The active medium is deposited at least on the contacts 24 which will optically change properties in response to the combined voltages or currents in the respective crossover point 26 formed by the row 18 and column 20. The active medium at a given crossover point 26 will appear as a square or dot in the overall checkerboard type matrix of the display 10. The actual size of the transistors 22 and the contacts 24 are not now drawn to scale, but are shown schematically for illustration only.

It should be noted that theoretically there is no limit on the number of rows 18 and columns 20 that can be employed, only a portion of which are illustrated in FIG. 1. Therefore, there is also no theoretical limit on the outside dimensions of such a device 10. However, the present state of the lithographic art places a practical limit on the outside dimensions of these devices. The present alignment techniques generally allow high resolution display devices to be manufactured approximately five inches on a side 28, although improved techniques of up to fourteen inches on a side has been demonstrated.

The problem encountered by the prior art method of manufacture is that if the array of device 10 contains any defective pixel transistors 22 or other circuit elements causing a pixel to be inoperative, it must be discarded.

Referring in detail to FIG. 2, several problems occur when the switching element, transistor 22 is manufactured. The substrate 12 is a substantial portion of the backplane cost and hence an inexpensive soda-lime glass is generally utilized. It has been demonstrated by liquid crystal display manufacturers that the high sodium concentration can poison the liquid crystal materially diffusing through the overlying ITO layer and hence an $SiO_2$ suppression layer 30 is generally formed on the substrate 12. There are some high quality low sodium types of substrates available, which would not need the suppression layer 30. An ITO layer 32 is formed and etched to provide an ITO free area on which the gate 18 is deposited. Following the deposition of the gate 18, a gate insulator layer 34 is deposited. Although a smooth uniform coverage of the gate 18 by the insulator 34 is illustrated, in production the gate 18 has or can have sharp edges which lead to pin holes or thinning of the insulator 34 at the gate edges. The source and drain metals can short to the gate 18. The thinning or pin holes produce transistors 22, which if operative, do not have uniform operating characteristics and hence the backplane is worthless.

One attempt to solve this problem, is to make the gate 18 very thin, but the resistivity is then too high to make the large arrays necessary for the backplane. A second attempt to solve the problem, is to make the gate insulator 34 very thick, but this decreases the gain of the transistor 22 and is also self defeating.

An amorphous silicon layer 36 is then deposited, with the source 20 and a drain 38 deposited thereover. A passivating layer (not shown) would be deposited over the completed structure to complete the transistor 22. During operation the activation of the source 20 and the gate 18 couples power through the silicon alloy 36 to the drain and hence to the contact pad 24 formed by the ITO layer 32.

During manufacture of the device 10, electrostatic discharge can occur when a high static electric potential is coupled across at least one pair of the gate lines 18 and the source lines 20. The discharge frequently will result in a short 39 through the insulator 34 or a short 39' through the insulator 34 and the silicon layer 36 in the transistor 22, between the adjacent crossover points of the lines 18 and 20 as can be seen in FIG. 2. This will cause at least one row and one intersecting column of the display pixels to be defective and in the type of display device 10, generally the defect will be a fatal one (clearly visible) and hence the device will be discarded. The device 10 does not provide any redundancy or subpixels and hence the defect cannot easily be isolated.

Referring now to FIG. 3, there is shown a schematic representation of one embodiment of a transistor 40 which can be utilized with the present invention. The transistor is more fully disclosed in U.S. Pat. Nos. 4,545,112 and 4,736,229, which are incorporated herein by reference.

A glass substrate 42 includes a barrier $SiO_2$ layer 44 thereon. As above mentioned, a low sodium glass substrate, such as Corning 7059 glass, could be utilized, and hence the barrier layer 44 can be eliminated. The detailed deposition steps are described in the above-referenced patent and application. An ITO layer 46 is deposited and then a refractory metal layer 48 is deposited on the ITO layer 46.

The layers 46 and 48 are etched to form a gate electrode 50. A gate insulator 52 and a semiconductor material 54 are sequentially deposited over the gate 50. The material 54 preferably is an amorphous silicon alloy. To avoid the possibility of any gate to source or drain shorts at gate edges 56, a dielectric 58 is deposited over the gate 55, the gate insulator 52 and the semiconductor 54. The dielectric 58 is deposited to a sufficient thickness to ensure that no shorts or thin spots are formed between the edges 56 of the gate 50 and a source 60 and a drain 62 deposited thereover.

The dielectric 58 is etched away only on a substantially planar central region 64 of the semiconductor layer 54. This insures uniform operating characteristics for the transistors 40 in the backplane array. A passivating layer 66 is deposited over the whole structure to complete the structure of the transistor 40.

During all of the transistor processing steps, the refractory metal layer 48 remains over a pixel contact pad 68 upon which the active material of the pixel is deposited. As a final step, before the active medium (not shown) is added to the backplane to complete the display, the refractory metal is etched off of the pixel pad 68 leaving the ITO layer 46 exposed after all the processing has been completed.

The gate to source or drain shorts referred to above in discussing the dielectric 58, refer to physical shorts caused by thin spots or actual metal particles or filaments. The electrostatic discharges caused during manufacturing and thereafter will be deterred by the dielectric 58, but will not be eliminated. The potential can be high enough to again form a short 69 through the gate insulator 52 and the semiconductor material 54 in the transistor 40, between the source 60 and the gate 50. Depending upon the display structure, at least one pixel or one subpixel (FIG. 4) will be defective.

Referring now to FIG. 4, a subpixel matrix display of the above-referenced application, U.S. Ser. No. 948,224, is designated generally by the reference numeral 70. The subpixel matrix display 70 is illustrated as having each pixel subdivided into four subpixels, but the pixels could be subdivided into numerous other configurations such as two subpixels, two by four or six subpixels or in three subpixels for color applications. Each pixel 72 is subdivided into four subpixels 74, 76, 78 and 30 (only one pixel 72 is so numbered for illustration). As previously stated, the number of pixels is merely shown for illustration purposes and the display 70 could contain any desired number and configuration, square or rectangular.

A column (source) line or bus 82 connects the subpixels 74 and 78 and all other column subpixel pairs in one-half of each of the pixels to a column or source contact pad 84 at one edge of the display 70. A second column (source) line or bus 86 connects the subpixels 76 and 80 and all other column subpixel pairs in the second half of each of the pixels to the column or source contact pad 84. The bus lines 82 and 86 are interconnected (shorted) at or before the pad 84 and are interconnected (shorted) at the opposite ends by a line or short 88.

A row (gate) line or bus 90 connects the subpixels 74 and 76 and all other row subpixel pairs in one-half of each of the pixels to a row (gate) pad 92. A second row (gate) line or bus 94 connects the subpixels 78 and 80 and all other row subpixel pairs in one-half of each of the pixels to the row pad 92. The bus lines 90 and 94 are interconnected (shorted) at or before the pad 92 and are interconnected (shorted) at the opposite ends by a line or short 96.

In a like manner, each of the other subpixel pairs are connected in columns to respective column (source) pads 98 and 100, etc. The pads 84, 98 and 100 are illustrated as being an opposite sides of the display to provide additional connecting space for the pads, however, they also could all be on one side as in the display 10. Each of the other subpixel pairs also are connected in rows to respective row (gate) pads 102 and 104, etc.

The pixel 72 then is divided into four subpixels 74, 76, 78 and 80 which allows for one of the subpixels to be defective, such as the subpixel 74, without causing a fatal defect, since the remaining three subpixels 76, 78 and 80 remain operative. In prior devices, the pixel 72 would be totally defective and hence the display 70 would be inoperable.

Further, one often fatal display defect is caused by a defect or open in one of the row or column bus lines which would cause the whole row or column to be out, again resulting in an inoperative display 70. With the respective subpixels pairs of row and column bus lines interconnected, however, an open in a bus line will at most cause one subpixel to be inoperative. An open in one or more of the bus lines between the subpixels will result in no defects, since the current is supplied from the opposite shorted end of the row or column bus line. Thus, the display 70 in effect has redundant row and column bus lines.

To avoid the fatal defect of the multiple open lines, as also disclosed in U.S. Ser. No. 948,224, the redundant row and column bus lines can be further interconnected at each subpixel. Each pair of the column bus lines 82 and 86 are additionally interconnected between each of the subpixels 74, 78, etc. by respective lines or shorts. In a like manner, each pair of the row bus lines 90 and 94 are interconnected between each of the subpixels 74, 76, etc. by respective lines or shorts. Further, although both the row bus lines and the column bus lines can be interconnected between each subpixel, only one of the row or the column bus line sets might be shorted to limit the loss of active pixel display area.

The short 69 in one of the active devices in the display 70 can be eliminated by opening the row or column line between the short and the line. This results in only one subpixel, such as the subpixel 74 being defective and due to the small size of the subpixel, is not a fatal defect (i.e. not readily visual). The rest of the corresponding column and row subpixels would be operable due to the redundant and interconnected row and column bus lines.

Figure 5:
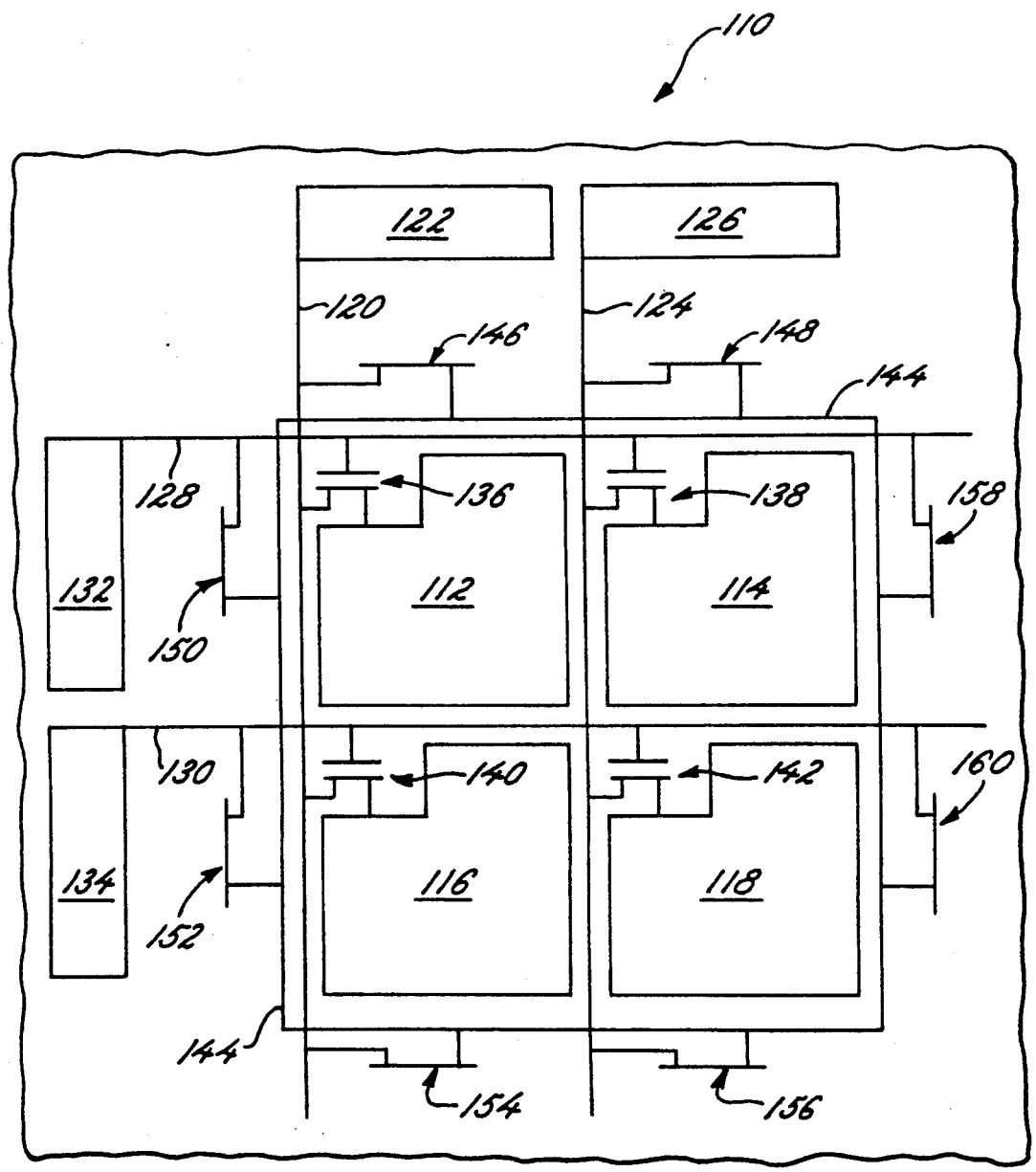
FIG. 5 is a plan view schematic representation of a matrix display illustrating one embodiment of an internal ESD guard ring of the present invention.

Referring now to FIG. 5, a matrix display incorporating one embodiment of an internal ESD guard ring of the present invention is designated generally by the reference numeral 110. The matrix display 110 is illustrated having four pixels 112, 114, 116 and 118. The pixels, however, can be subdivided into numerous subpixel configurations such as two or four subpixels, two by four or six subpixels or in three subpixels for color display applications. Also, as previously stated for the subpixel matrix display 70, the number of pixels can be of any number and configuration, square or rectangular.

A column (source) line or bus 120 connects the pixels 112 and 116 and all other pixels in the same column to a source contact pad 122 at one edge of the display 110. A source line 124 connects the pixels 114 and 118 to a source contact pad 126. In a like manner, a pair of row (gate) lines 128 and 130 connect respective pairs of pixels 112, 114 and 116, 118 in each row to respective gate pads 132 and 134.

Each pixel 112, 114, 116 and 118 includes a respective active element, such as transistors 136, 138, 140 and 142 which couple the pixels to the respective source lines 120 or 124 and gate lines 128 or 130. To prevent a large electrostatic potential discharging through one of the transistors 136, 138, 140 and 142, an internal ESD guard ring 144 is formed around the pixels 112, 114, 116 and 118. The guard ring 144 is illustrated as a closed ring, but could also be an open L or C-shaped line if the gate and source pads all are on one respective side of the display 110.

The ESD guard ring 144 also is coupled via respective transistors 146, 148, 150 and 152 to, the source and gate lines. The guard ring 144 will be coupled to the end of each source and gate line, so if the source and gate lines include pads at their opposite ends (not illustrated), then the guard ring 144 will include a further respective set of transistors 154, 156, 158 and 160.

The ESD guard ring 144 preferably is formed from a low resistance metal, such as an aluminum alloy. The transistors 146 through 160 can include a floating gate (not illustrated), no gate, or can include an oxide below to form a spark gap.

In operation, with the guard ring 144, a potential placed upon the source pads 122 will not short one of the transistors 136 or 140. Instead, the transistor 146 will turn on followed by the transistor 150, shorting the potential from the pad 122, via the line 120, the transistor 146, the guard ring 144, the transistor 150 and the line 128 to the pad 132. Thus, the guard ring 144 will not allow high potentials across the pads 122, 126, 132 and 134. The guard ring 144 preferably is formed concurrently with the display elements and is not removed, providing continuous protection even following manufacture of the display 110.

Figure 6:
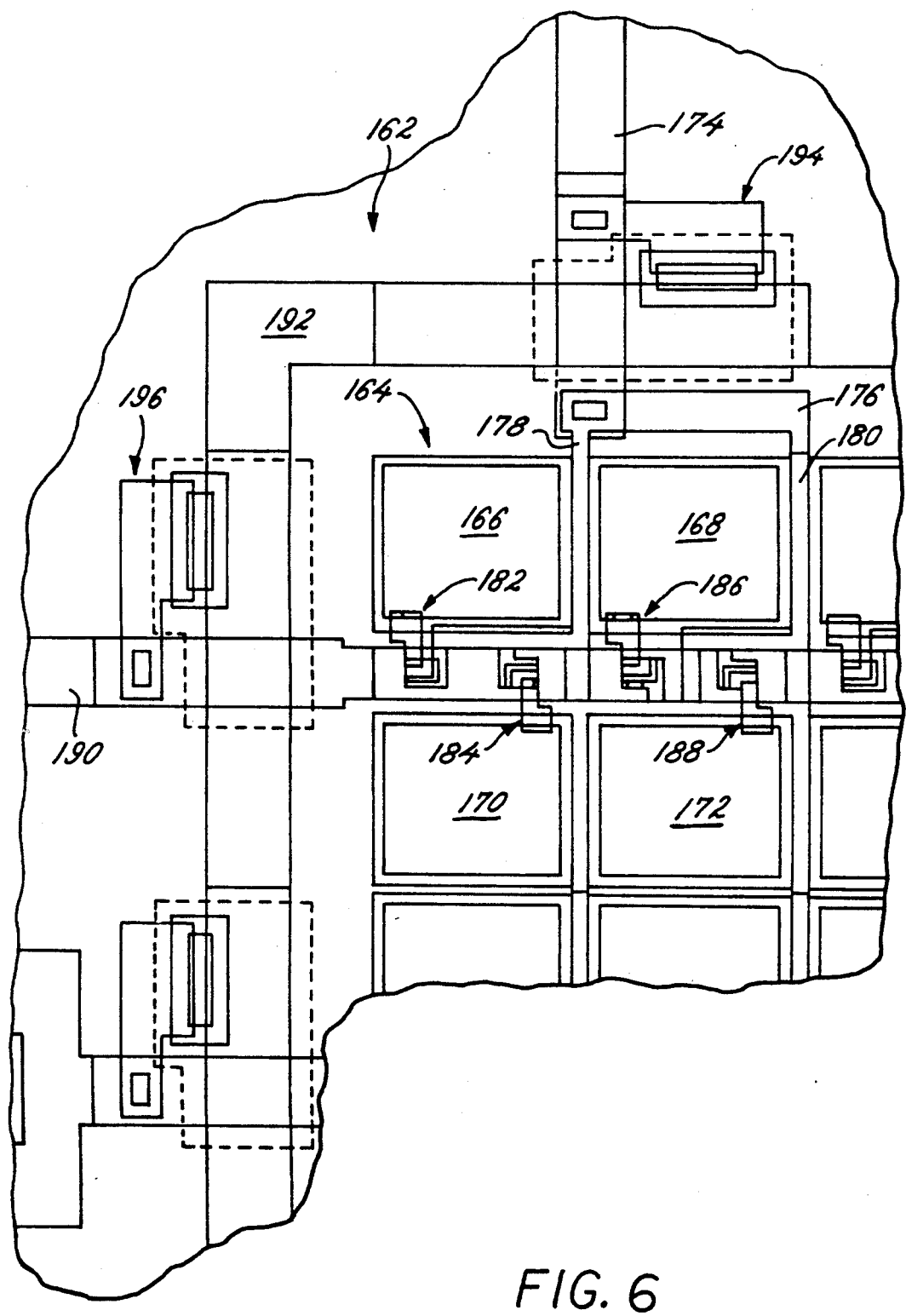
FIG. 6 is an enlarged plan view of a portion of one embodiment of a subpixel matrix display illustrating the internal ESD guard ring in accordance with the present invention.

A specific subpixel display incorporating an internal guard ring of the invention is best illustrated in FIG. 6 and is designated generally by the reference numeral 162. The display 162 includes a plurality of pixels, each having four subpixels in a similar fashion to the display 70 illustrated in FIG. 4. Only one pixel 164 is illustrated in detail and includes four subpixels 166, 168, 170 and 172. A source line 174 includes a shorting line 176 which is connected to a pair of source lines 178 and 180, coupled to each of the subpixels by a respective transistor structure 182, 184, 186 and 188, which are not described in detail. The transistors 182, 184, 186 and 188 also couple the subpixels 166, 168, 170 and 172 to a gate line 190.

An internal ESD guard ring 192 is coupled via a transistor structure 194 to the source line 174 and via a transistor structure 196 to the gate line 190. The guard ring 192 and transistors 194 and 196 operate as before described to short any potential to ground. The low value of the normal operating voltages does not turn on the transistors 194 and 196, which do not effect the normal display operation.

Figure 7:
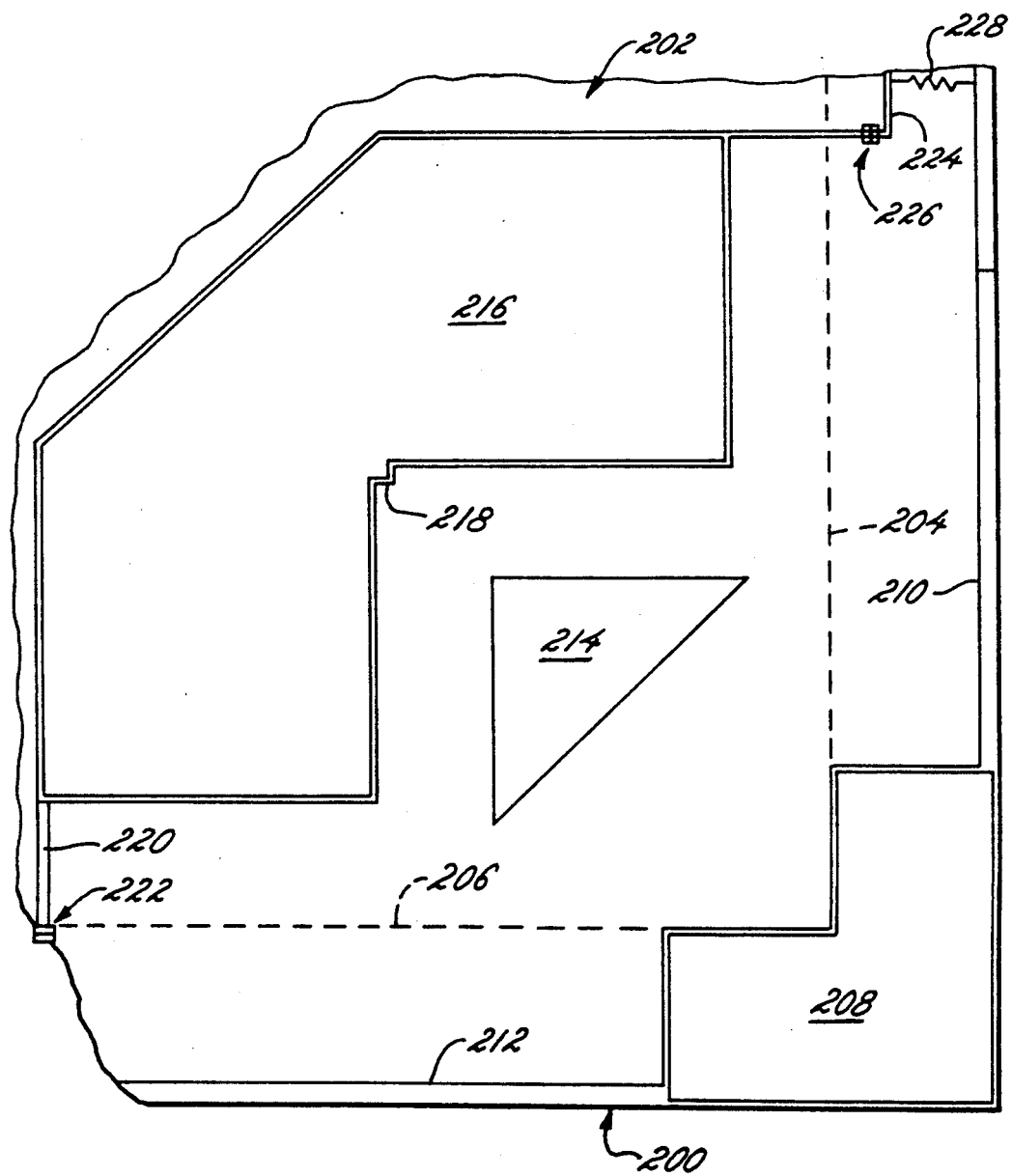
FIG. 7 is a partial plan view of one embodiment of an exterior ESD guard ring of the present invention.

The ESD preventive structure can also include an outer ESD guard ring 200, best illustrated in FIG. 7. Only one corner portion 202 of the display and guard ring 200 is illustrated. While the display is being manufactured, the outer guard ring 200 is connected to all of one of the source and gate pads (not illustrated), which pads are serially connected together via jumpers outside of scribe lines 204 and 206. A corner pad 208 is connected to each other corner pad (not illustrated) by respective outer conductive lines 210 and 212 of the guard ring 200. The L-shaped corner pad 208 can be grounded and also provides the alignment for the scribe lines 204 and 206, which are utilized to disconnect the source and gate jumpers and the guard ring 200 after the structure is completed. The corner portion 202 includes a triangular pad 214 which provides alignment for diagonal corner displays, when utilized.

A backplane pickup contact pad 216 also is provided, which includes a corner 218 for aligning the backplane with the front plane. The pad 216 includes a shunt line 220 which is connected to one set of source or gate lines via a shunt transistor 222 along the edge to be scribed and removed along the line 206. The line 210 is connected to the other set of gate or source lines by a shunt line 224, a shunt transistor 226 and a large resistance 228, such as 100 K ohms (illustrated schematically). The outer ESD guard ring 200 provides ESD protection only during manufacture of the display and is removed prior to completion of the display. The resistance 228 provides an ESD short for high electrostatic potentials, which can be incurred during manufacturing of the display which can be connected anywhere between the line 210 and the other set of gate or source lines. The resistance 228 minimizes the discharge current surge and the shunt transistors 222 and 226 act as before described. There will be at least one corner backplane pickup pad 216 and preferably there will be two or three, each with their associated shunt transistors.

The outer guard ring lines 210 and 212 preferably are formed at the same time as the firs: of the gate or source lines. The inner guard ring 44 and the associated shunt transistors of both guard rings preferably are formed concurrently with the other display structures. The scribe lines 204 and 206 can be prescribed, but left intact until the back and front planes are mated and then removed to provide the gate and source contacts for the printed circuit board connections.

Modification and variations of the present invention are possible in light of the above teachings. The transistors 22 or other types of two or three terminal switching devices can be utilized with the invention. The amorphous silicon alloy semiconductor material 54, could be any of numerous types of materials such as CdSe or GaAs materials. The ESD guard rings can be utilized separately or together with all types of active element matrix displays and not just those illustrated. The shunt transistors 146, 194 and 222, etc. also can be formed as other active switching elements, such as diodes. It is therefore to be understood that within the scope of the appended claims, the invention may be practiced otherwise than as specifically described.

What is claimed and desired to be secured by Letters Patent of the United States is:

1. A method of manufacturing active matrix display backplanes and displays therefrom, comprising:
   providing a substrate;
   forming a pattern of pixels on said substrate;

forming a plurality of row and column intersecting pixel activation lines, interconnecting substantially all of said row lines to one another and substantially all of said column lines to one another;

forming an outer electrostatic discharge guard ring on said substrate coupled to said interconnected row and column lines via a resistance to provide protection from electrostatic discharges between said row and column activation lines during manufacture of the displays; and removing said outer guard ring and row and column interconnections prior to completion of the display.

2. The method as defined in claim 1 including coupling one plurality of said interconnected row and column lines to said outer guard ring via said resistance.

3. The method as defined in claim 2 including forming at least one pickup pad coupled to said resistance via a shunt switching element.

4. The method as defined in claim 3 including coupling said pickup pad to the other plurality of said interconnected row and column lines via another shunt switching element.

5. The method as defined in claim 3 including forming a corner on said pad to align the front plane and back plane of the display.

6. The method as defined in claim 3 including forming a plurality of pickup pads, each one on a separate corner of the display.

7. The method as defined in claim 1 including forming a corner pad on at least one corner of the display and aligning scribe lines with said corner pad for removing said outer guard ring and row and column intersections.

8. The method as defined in claim 1 including forming an inner electrostatic discharge guard ring on said substrate coupled to said row and column lines via shunt switching elements to provide protection from electrostatic discharges between said row and column activation lines during manufacture of the displays and thereafter.

9. The method as defined in claim 8 including forming separate shunt switching elements between said inner guard ring and each row and column line.

10. A method of manufacturing active matrix display backplanes and displays therefrom, comprising:
providing a substrate;
forming a pattern of pixels on said substrate;
forming a plurality of row and column intersecting pixel activation lines; and
forming an inner electrostatic discharge guard ring on said substrate coupled to said row and column lines via shunt switching elements to provide protection from electrostatic discharges between said row and column activation lines during manufacture of the displays and thereafter.

11. The method as defined in claim 10 including forming separate shunt switching elements between said inner guard ring and each row and column line.

12. The method as defined in claim 10 including interconnecting substantially all of said row lines to one another and substantially all of said column lines to one another and forming an outer electrostatic discharge guard ring on said substrate coupled to said interconnected row and column lines via a resistance to provide protection from electrostatic discharges between said row and column activation lines during manufacture of the displays; and removing said outer guard ring and row and column interconnections prior to completion of the display.

13. The method as defined in claim 12 including coupling one plurality of said interconnected row and column lines to said outer guard ring via said resistance.

14. The method as defined in claim 13 including forming at least one pickup pad coupled to said resistance via a shunt switching element.

15. The method as defined in claim 14 including coupling said pickup pad to the other plurality of said interconnected row and column lines via another shunt switching element.

16. The method as defined in claim 14 including forming a corner on said pad to align the front plane and back plane of the display.

17. The method as defined in claim 10 including forming a plurality of pickup pads, each one on a separate corner of the display.

18. The method as defined in claim 10 including forming a corner pad on at least one corner of the display and aligning scribe lines with said corner pad for removing said outer guard ring and row and column intersections.

19. An active matrix display backplane, comprising:
a substrate;
a pattern of pixels formed on said substrate;
a plurality of row and column intersecting pixel activation lines, substantially all of said row lines interconnected to one another and substantially all of said column lines interconnected to one another; and
an outer removable electrostatic discharge guard ring formed on said substrate coupled to said interconnected row and column lines via a resistance to provide protection from electrostatic discharges between said row and column activation lines during manufacture of the displays.

20. The backplane as defined in claim 19 including one plurality of said interconnected row and column lines coupled to said outer guard ring via said resistance.

21. The backplane as defined in claim 20 including at least one pickup pad coupled to said resistance via a shunt switching element.

22. The backplane as defined in claim 21 including said pickup pad coupled to the other plurality of said interconnected row and column lines via another shunt switching element.

23. The backplane as defined in claim 21 including a corner formed on said pad to align the front plane and back plane of the display.

24. The backplane as defined in claim 21 including a plurality of pickup pads, each one formed on a separate corner of the display.

25. The backplane as defined in claim 19 including a corner pad formed on at least one corner of the display and having scribe lines aligned with said corner pad for removing said outer guard ring and row and column intersections.

26. The backplane as defined in claim 19 including an inner electrostatic discharge guard ring formed on said substrate coupled to said row and column lines via shunt switching elements to provide protection from electrostatic discharges between said row and column activation lines during manufacture of the displays and thereafter.

27. The backplane as defined in claim 26 including separate shunt switching elements formed between said inner guard ring and each row and column line.

28. An active matrix display backplane, comprising:
a substrate;
a pattern of pixels formed on said substrate;
a plurality of row and column intersecting pixel activation lines; and
an inner electrostatic discharge guard ring formed on said substrate coupled to said row and column lines via shunt switching elements to provide protection from electrostatic discharges between said row and column activation lines during manufacture of the displays and thereafter.

29. The backplane as defined in claim 28 including separate shunt switching elements formed between said inner guard ring and each row and column line.

30. The backplane as defined in claim 28 including substantially all of said row lines interconnected to one another and substantially all of said column lines interconnected to one another and an outer electrostatic discharge guard ring formed on said substrate coupled to said interconnected row and column lines via a resistance to provide protection from electrostatic discharges between said row and column activation lines during manufacture of the displays.

31. The backplane as defined in claim 30 including one plurality of said interconnected row and column lines coupled to said outer guard ring via said resistance.

32. The backplane as defined in claim 31 including at least one pickup pad coupled to said resistance via a shunt switching element.

33. The backplane as defined in claim 32 including said pickup pad coupled to the other plurality of said interconnected row and column lines via another shunt switching element.

34. The backplane as defined in claim 32 including a corner formed on said pad to align the front plane and back plane of the display.

35. The backplane as defined in claim 28 including a plurality of pickup pads, each one formed on a separate corner of the display.

36. The backplane as defined in claim 28 including a corner pad formed on at least one corner of the display and having scribe lines aligned with said corner pad for removing said outer guard ring and row and column intersections.

* * * * *

UNITED STATES PATENT AND TRADEMARK OFFICE
CERTIFICATE OF CORRECTION

PATENT NO. : 5,019,002
DATED : May 28, 1991
INVENTOR(S) : Scott H. Holmberg

It is certified that error appears in the above-identified patent and that said Letters Patent is hereby corrected as shown below:

Col. 2, lines 30-31, change "4,676,761" to --4,820,222--;

Col. 4, line 15, change "materially" to --material by--;

Col. 5, line 53, change "30" to --80--;
       line 59, change "aIl" to --all--;

Col. 7, line 23, delete the third comma;

Col. 8, line 41, change "firs:" to --first--.

Signed and Sealed this

Twenty-third Day of February, 1993

Attest:

STEPHEN G. KUNIN

Attesting Officer     Acting Commissioner of Patents and Trademarks